(12) United States Patent
Makainai

(10) Patent No.: US 9,532,503 B2
(45) Date of Patent: Jan. 3, 2017

(54) MONOFILAMENT LINE HOLDER FOR GRASS TRIMMERS

(71) Applicant: Ernest Kalani Makainai, Kaneohe, HI (US)

(72) Inventor: Ernest Kalani Makainai, Kaneohe, HI (US)

(*) Notice: Subject to any disclaimer, the term of this patent is extended or adjusted under 35 U.S.C. 154(b) by 56 days.

(21) Appl. No.: 14/530,612

(22) Filed: Oct. 31, 2014

(65) Prior Publication Data

US 2015/0115110 A1    Apr. 30, 2015

Related U.S. Application Data

(60) Provisional application No. 61/962,254, filed on Oct. 31, 2013, provisional application No. 61/995,196, filed on Apr. 3, 2014.

(51) Int. Cl.
*F16L 3/22*   (2006.01)
*A01D 34/416*   (2006.01)
*F16G 11/00*   (2006.01)

(52) U.S. Cl.
CPC .......... *A01D 34/4166* (2013.01); *F16G 11/00* (2013.01)

(58) Field of Classification Search
CPC ... A01D 34/416; A01D 34/4166; F16M 13/02
USPC .................. 248/68.1; 30/276, 296.1; 56/12.7
See application file for complete search history.

(56) References Cited

U.S. PATENT DOCUMENTS

| 4,285,128 | A | * | 8/1981 | Schnell | A01D 34/4161 30/276 |
| 4,316,325 | A | | 2/1982 | Brucker | |
| 4,369,577 | A | * | 1/1983 | Gise | A01D 34/4161 30/276 |
| 4,673,309 | A | * | 6/1987 | Schlaich | E01D 19/14 164/108 |
| 4,733,471 | A | * | 3/1988 | Rahe | A01D 34/90 30/276 |
| 5,052,262 | A | * | 10/1991 | Havens | G10D 13/065 84/421 |
| 5,742,982 | A | * | 4/1998 | Dodd | F16G 11/00 24/16 R |
| 5,862,834 | A | * | 1/1999 | Ziu | F16L 7/00 138/108 |
| 6,494,427 | B1 | | 12/2002 | Smith | |
| 6,581,246 | B1 | * | 6/2003 | Polette | A01D 34/90 16/426 |
| 6,726,143 | B1 | | 4/2004 | Mills | |

(Continued)

*Primary Examiner* — Todd M Epps
(74) *Attorney, Agent, or Firm* — Intellectual Property Law Group LLP

(57) ABSTRACT

A device for holding lines in a holder secured around an object such as a shaft of garden equipment. The device comprises a hollow body having an outer surface and an inner surface, two opposing end surfaces; a plurality of longitudinal bores passing through the body from the end surfaces, wherein each of the bores is configured to receive and hold an individual line; and at least one fastener to secure the body to an object. Each of the bores has a substantially straight axis so that the individual lines when inserted, remain securely retained, and are conveniently removed when needed. The device body may be further divided into two body segments with one or more flanges on each of the two body segments, and an aperture on each of the one or more flanges for receiving a fastener to securely lock the body to the object.

20 Claims, 6 Drawing Sheets

(56) References Cited

U.S. PATENT DOCUMENTS

| | | | |
|---|---|---|---|
| D551,862 S | 10/2007 | Gerry | |
| 7,467,470 B2 | 12/2008 | Robinson | |
| 7,797,839 B2 | 9/2010 | Prolux | |
| 8,677,632 B2* | 3/2014 | Yamaoka | A01D 34/4166 30/276 |
| 2003/0226929 A1 | 12/2003 | Knizner | |
| 2012/0085855 A1* | 4/2012 | Mitchell | A01D 34/4166 242/476.7 |
| 2012/0311908 A1* | 12/2012 | Kenney | F41A 21/485 42/75.02 |
| 2013/0048826 A1* | 2/2013 | Go | E02F 9/2275 248/560 |
| 2014/0260839 A1* | 9/2014 | Hurley | B25F 5/006 81/489 |

* cited by examiner

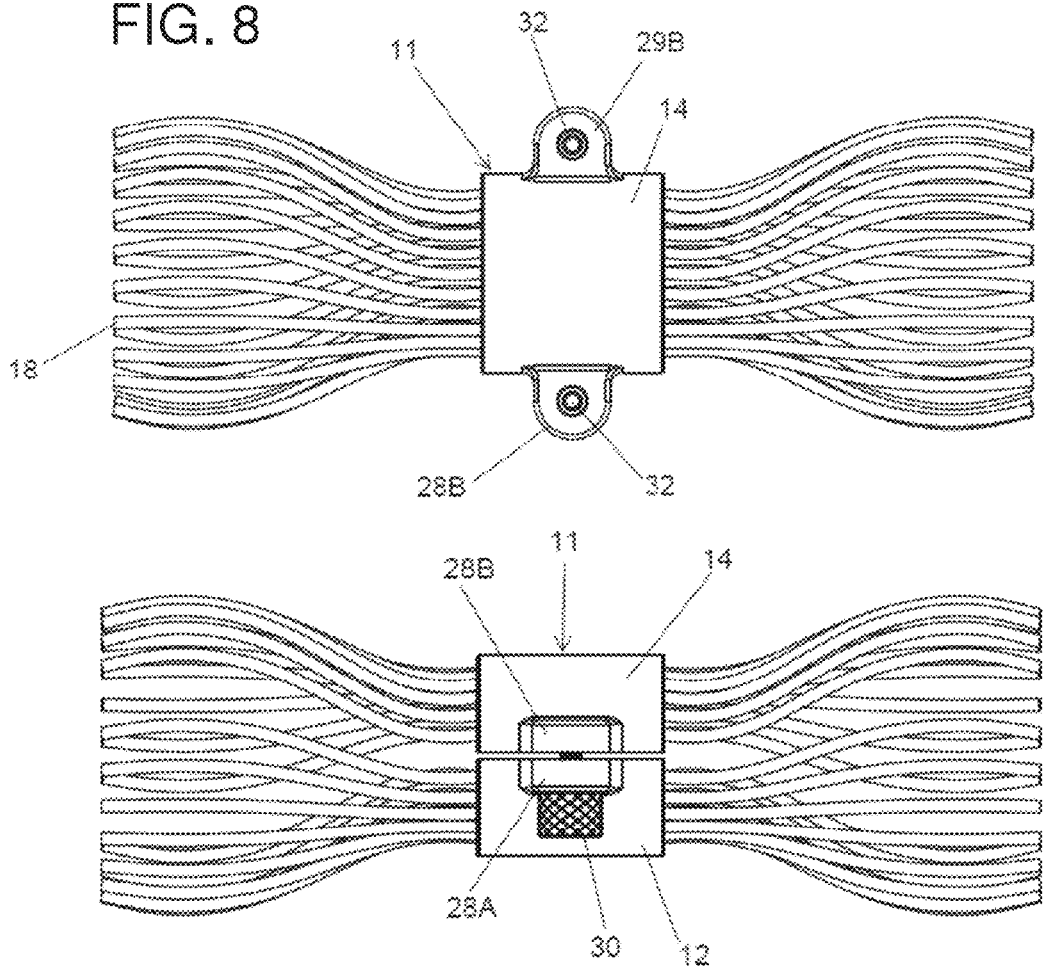
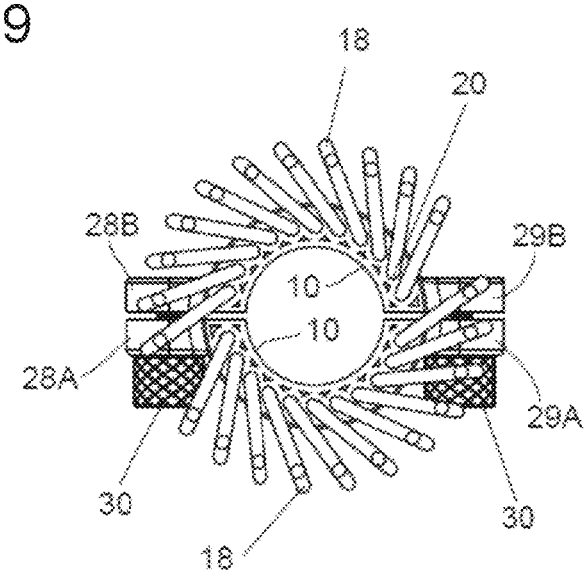

MONOFILAMENT LINE HOLDER FOR GRASS TRIMMERS

CROSS-REFERENCE TO RELATED APPLICATIONS

This application claims priority to U.S. provisional patent application Ser. No. 61/962,254, filed on Oct. 31, 2013 and U.S. provisional patent application Ser. No. 61/995,196, filed on Apr. 3, 2014, each of which are hereby incorporated by reference in its entirety.

BACKGROUND OF THE INVENTION

1. Field of the Invention

Aspects of the present invention relate to a device for holding lines for trimming plant life. In particular, there is a device for holding lines in a holder secured around garden equipment.

2. Background

Without limiting the scope of the invention, the present background is described in connection of storing spare grass/weed trimmer lines for the ease of the operator to retrieve. Grass/weed trimmers are the most popular machines used in areas where larger machines such as mowers are not able to go, such as ditches and hillsides. Grass/weed trimmers use a consumable monofilament type of line to accomplish trimming areas of lawn, parks, or any grassy area to be groomed. The trimmer line is constantly being abraded during the operation of the grass/weed trimmer. Many of these grass/weed trimmers require the operator to manually replace the line once the line can no longer cut. In any case, obtaining replacement line is a frequent and inconvenient occurrence which makes the operator unorganized and inefficient.

Accordingly, there is a need to solve this problem through means of a line holder which may be secured around the shaft of the grass/weed trimmer where it would hold a supply of individual strands of replacement trimming line. Further, it is desirable to have a trimmer line holder which enables each line to be measured and cut to a desired length prior to replacing the exhausted trimmer line to the grass/weed trimmer head. This will keep the operator organized and efficient.

Prior devices have attempted to solve the problems discussed above. For example, there are described devices having a tubular housing with two clamps on both ends that would be affixed onto the shaft of a grass/weed trimmer; or containers carrying replacement trim lines that are otherwise attached to weed trimmers. Although the devices may do the job intended, these devices are bulky and in the way of the operator, and further fail to conveniently hold individually retrievable lines, therefore constricting the flow of movement of the operator.

As such, a need does exist for a holding device which provides a means to store a supply of individual replacement line that would be attainable instantly for the use of the operator. There is also a need to secure a holding device in the field both quickly and easily, where the device is not in the way of the operator.

SUMMARY OF THE INVENTION

Embodiments of the present invention provide a line holding device for storing spare replacement trimmer line, comprising a housing or body affixed onto an object such as the shaft of the grass/weed trimmer. The housing or body is configured as a collar with a certain sized bores or apertures running through the collar, providing a channel for the replacement trimmer line to go through. The replacement trimmer line is positioned to be readily exposed and available for the operator to use.

According to an embodiment of the present invention, there is a line holder comprising: a hollow body having an outer surface and an inner surface, a first surface at a first distal end, and a second surface at an opposite second distal end; a plurality of longitudinal bores passing through the body from the first surface to the second surface, wherein each of the plurality of bores is configured to receive and hold an individual line; and at least one fastener to secure the body to an object; wherein the inner surface is configured to contact the object.

In another embodiment of the present invention there is a line holder comprising: a collar shaped body, the body having an outer surface and an inner surface, a first surface at a first distal end, the first surface defined from an outermost edge of the outer surface at the first distal end toward an edge of the inner surface at the first distal end, and a second surface at an opposite second distal end, the second surface defined from an outermost edge of the outer surface at the second distal end toward an edge of the inner surface at the second distal end, wherein the body is separable into two segments; a plurality of longitudinal bores passing through the body from the first surface to the second surface, wherein each of the plurality of bores is configured to receive and hold an individual line; a pair of flanges on each of the body segments, wherein the pair of flanges on a first body segment is aligned with the pair of flanges on the second body segment so as to form a first aligned set of flanges and a second aligned set of flanges; and a fastener configured to secure the body segments together through at least one of the aligned set of flanges, thereby locking the two body segments together and securing the body around an object.

The line holder can be of different sizes with bores or channels that would provide a space for small monofilament trimmer line for non-commercial use to larger monofilament line for commercial industrial use. The bores are configured along a straight axis and having a diameter such that the inserted line is retained without falling out yet easily removed when needed. Since monofilament trimmer line normally has a bend, the trimmer lines become naturally locked into the bores/channels making the lines difficult to fall out while the trimmer is in use, but easy enough for the operator to retrieve with ease when needed.

A body segment or half of the line holder may be secured onto an object by one or more fasteners. In an embodiment, a screw is used on each side of body that secures the body segments or body halves around the shaft of a grass/weed trimmer and or the handle of a string trimmer mower. The body halves can also be secured together around the shaft with a variety of fasteners such as screws, ties, Velcro straps, clamps, clips, or other attachment mechanisms.

The object around which the line holder is secured about can have a cylindrical-like structure or a component such as a shaft of garden equipment. In another embodiment, the line holder may be configured to be attached to the operator.

Embodiments of the present invention can be constructed from different materials such as and not limited to different types of plastics, polymers, polystyrene, ABS, nylon, synthetic materials, resins, rubber, silicone, light metals, as well as from wood or leather and combinations thereof.

Besides being used for gas fueled trimmers and electric grass trimmers, embodiments of the invention can also be used for a string trimmer mower. Embodiments of the invention can also be of different sizes to hold the different sized line monofilaments from lite commercial to industrial.

These and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

FIG. 8 illustrates a top view of the line holder engaged with spare lines inserted into the plurality of longitudinal bores through the body, according to an embodiment of the present invention.

FIG. 9 illustrates a side view of the line holder engaged with spare lines inserted into the plurality of longitudinal bores through the body, according to an embodiment of the present invention.

FIG. 10 illustrates a front view of the line holder engaged with spare lines inserted into the plurality of longitudinal bores through the body, according to an embodiment of the present invention.

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

Figure 1:
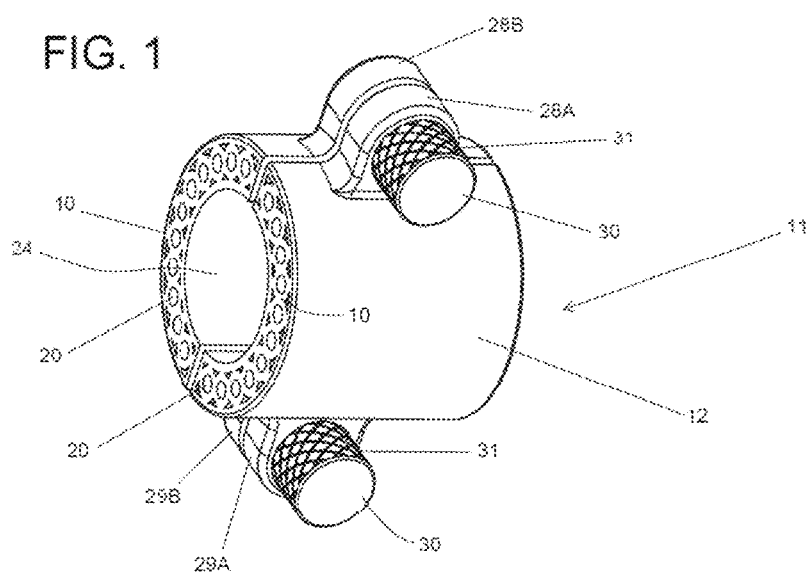
FIG. 1 illustrates a front, bottom perspective view of the line holder showing screw heads, according to an embodiment of the present invention.
Figure 2:
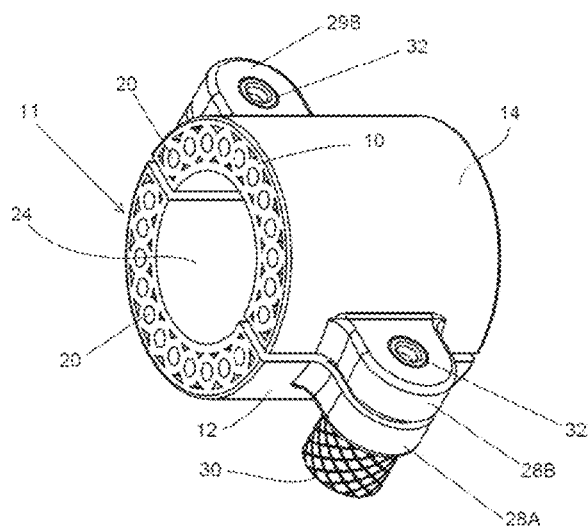
FIG. 2 illustrates a front, top perspective view of the line holder showing screw ends, according to an embodiment of the present invention.

FIGS. 1-2 illustrate one embodiment of a line holder, in a bottom and top perspective view respectively. The line holder comprises a body 11 substantially cylindrical in shape and having an inner surface 24, where the body includes two body segments or halves 12 and 14. The body 11 includes a plurality of longitudinal bores or channels 20 that go through the body 11, where the longitudinal bores are on a surface 10 at each end of the body 11. Surface 10 may be configured as planar surface on each end of the body 11. According to an embodiment, the line holder includes one or more flanges 28A, 28B, 29A, and 29B and one or more apertures 16 and 32, wherein one of the one or more apertures 16 and 32 resides on each of the one or more flanges 28A, 28B, 29A, and 29B. According to one or more embodiments, each of the one or more flanges 28A, 28B, 29A, and 29B is attached to one of the two body halves 12 and 14 and is substantially flush with the body half. When the two body halves 12 and 14 are aligned together, the apertures 16 and 32 on each body half 12 and 14 are aligned over each other. The line holder includes one or more fasteners, such as screws 31, each of the one or more screws 31 having a screw head 30.

A variety of screw types may be incorporated into the holder for attaching the holder to an object. It an embodiment, the screw is a thumb screw 31 having a head 30 with Phillips head type, Frearson head type or flat head type or other slot types and configurations or even a smooth head. Use of a thumb screw is envisioned to support quick and easy attachment and adjustment of the holder by an operator while in the field without the use of tools.

In a preferred embodiment, the line holder includes two screws 31, four flanges 28A, 28B, 29A, and 29B, and four apertures 16 and 32, where each of the two screws 31 is threaded and each of the four apertures 16 and 32 is threaded. Two flanges 28A, 28B, 29A, and 29B are on each of the two body halves 12 and 14. To lock the two body halves 12 and 14 together, a screw 31 may be threaded into a first aperture 16 on one body half 12 and into a second aperture 32 on another body half 14. Similarly, another screw 31 may be threaded into one aperture 16 on one body half 12 and into a second aperture 32 on another body half 14. According to one or more embodiments, the first aperture 16 is an insertion aperture and the second aperture 32 is a receiving aperture. A user may thread the one or more screws 31 into the apertures 16 and 32 by hand. In other embodiments, a screw requiring a use of a tool can be used.

In another embodiment of the present invention, the line holder includes one or more ties. To lock the two body halves 12 and 14 together, a tie (not shown) may be inserted into one aperture 16 on one body half 12 and into a second aperture 32 on another body half 14 and secured. Similarly, another tie (not shown) may be inserted into one aperture 16 on one body half 12 and into a second aperture 32 on another body half 14 and secured. Ties may include plastic wire ties, Velcro straps, and other tying mechanisms. A variety of fastening means may be used including clips and metal hose clamps.

According to one or more embodiments, the body 11 is made of polymeric plastic, polystyrene, acrylonitrile butadiene styrene (ABS), silicone, resins, engineered plastics, light weight metals, wood, leather, or other material and combinations thereof. In a preferred embodiment, the body 11 is made of hard plastic such as nylon. In another preferred embodiment, the body 11 is made of aluminum.

Figure 3:
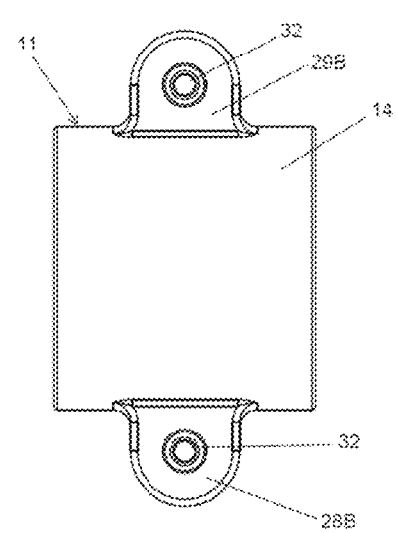
FIG. 3 illustrates the top view of the line holder, according to an embodiment of the present invention.
Figure 4:
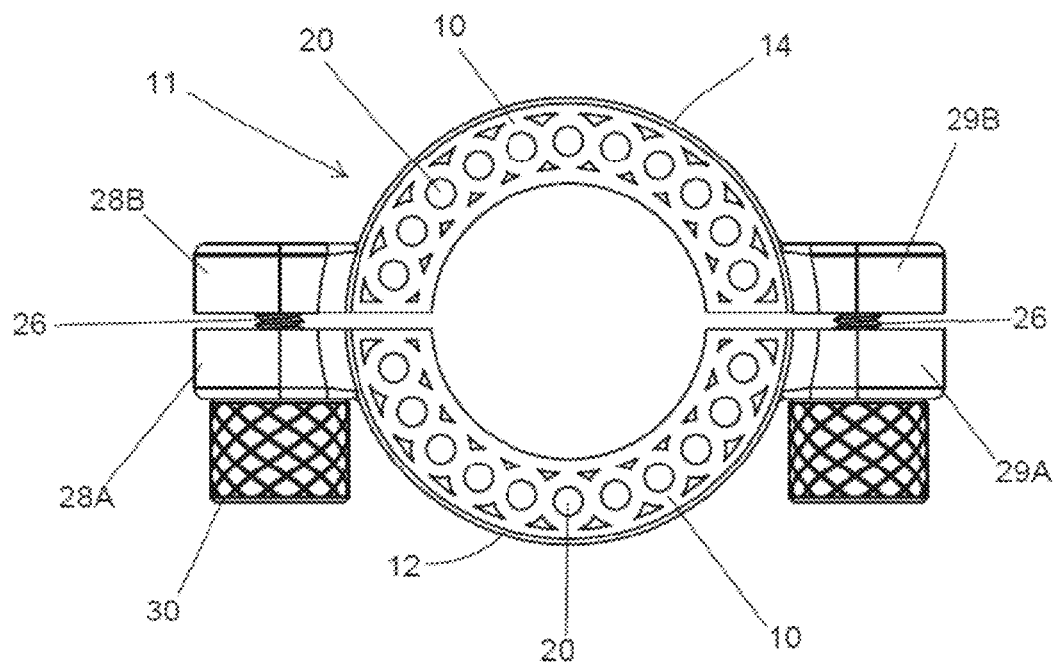
FIG. 4 illustrates a front view of the line holder, according to an embodiment of the present invention.
Figure 5:
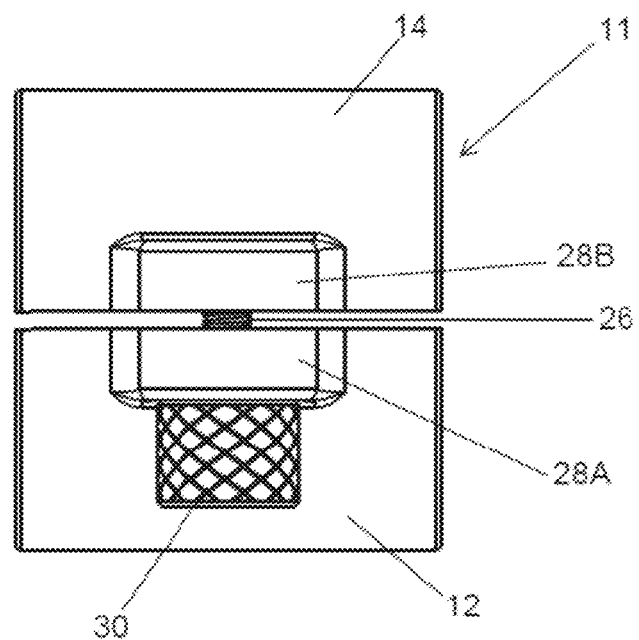
FIG. 5 illustrates a side view of the line holder, according to an embodiment of the present invention.

FIGS. 3-5 illustrate the line holder when assembled, according to one or more embodiments of the line holder. FIG. 3 is a top view of the line holder, where two screws 31 are threaded into the apertures 16 and 32 from the opposite side of the body 11. FIG. 4 is a front end view of the line holder, showing the plurality of longitudinal bores 20 that go through the body 11. FIG. 5 is a side view of the line holder, where one screw 31 is shown threaded into the apertures 16 and 32 from the bottom. A threaded stem 26 of the screw 31 is shown between the two flanges 28A and 28B. The body may be formed as a collar shape and adjusted to fit a variety of object sizes. Larger object diameters may be accommodated by the segmented parts of the body. It is further contemplated that the body is separated at one side so as to clamp around the object, and requiring only one fastening side.

Figure 6:
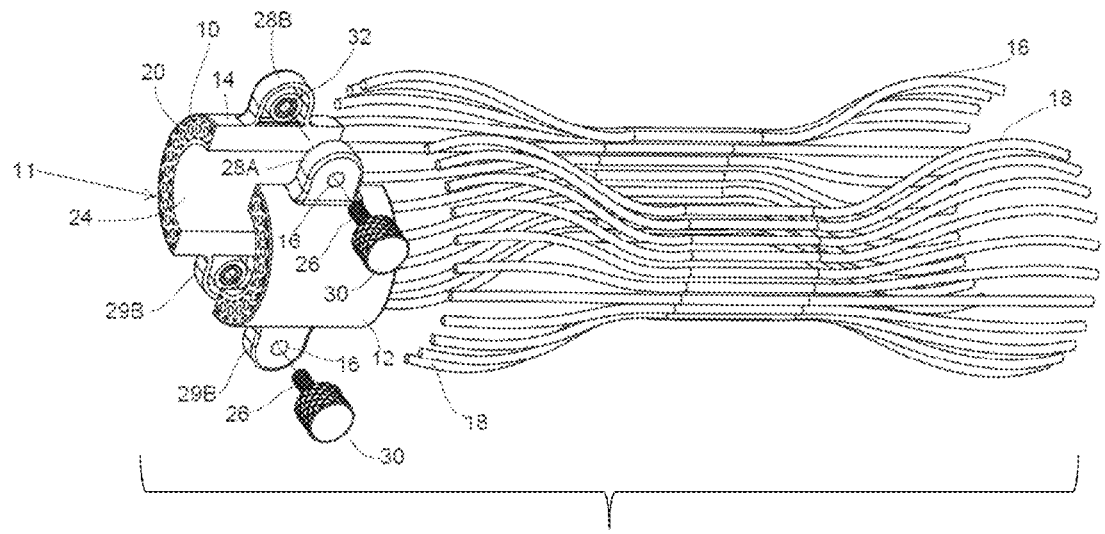
FIG. 6 illustrates an exploded view of the line holder and spare lines, according to an embodiment of the present invention.

FIG. 6 illustrates one embodiment of the line holder in an exploded view. Spare trimmer lines 18 are shown next to the line holder. Spare lines 18 typically comprise monofilament line. The line may be obtained as pre-cut strands or prepared by cutting pieces from a continuous line, and then inserted into the line holder for storing. According to one or more embodiments, one spare line 18 may be received by each of the plurality of longitudinal bores 20. Due to the natural bend in the length of spare lines 18, which can be attributable to the manufactured packaging process, the spare lines 18 remain inserted in the longitudinal bores 20. In an embodiment, the bores 20 are configured along a straight axis, which provides the necessary tension or grip against the natural bend of the spare line, keeping the line in place and locked in the bore/channel during use, while being readily available for retrieval by the operator when needed. The plurality of longitudinal bores 20 may vary in size to receive spare lines 18 of different sizes, such as commercial line or non-commercial line.

In an embodiment, the diameter of the bore 20 is large enough to be easily visible and smoothly receive a spare line yet close enough in diameter to the spare line diameter to avoid slippage. In a further embodiment, one or more of the bores 20 may be configured to receive multiple individual lines. The bores run continuously through the body as perforations, front one end surface 10 to the other end surface 10. In an embodiment, a bore may run a partial distance through the body. In another embodiment, the bores 20 are positioned so as to surround the object to which the holder is attached.

Figure 7:
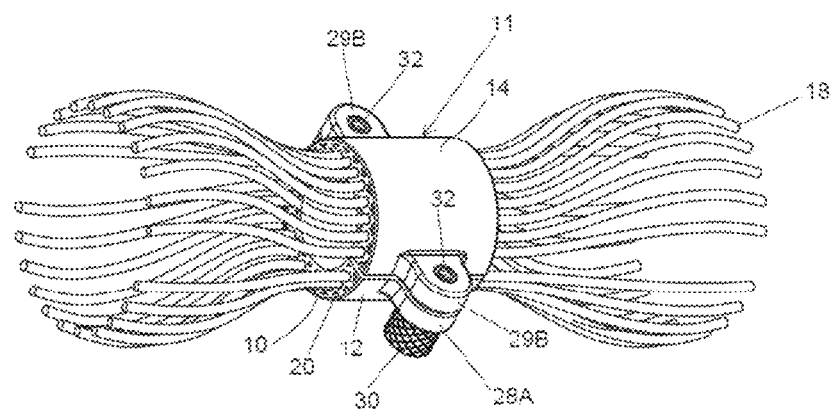
FIG. 7 illustrates a perspective view of the line holder engaged with spare lines inserted into the plurality of longitudinal bores through the body, according to an embodiment of the present invention.

FIG. 7 illustrates one embodiment of the line holder in an assembled view, with spare lines 18 inserted into the plurality of longitudinal bores 20 through the body 11.

FIGS. 8-10 illustrate the line holder assembled, according to one or more embodiments, with spare lines 18 inserted into the plurality of longitudinal bores 20 through the body 11. FIG. 8 is a top view of the line holder, showing a body side 14 where a screw 31 is threaded into each of the apertures 16 and 32 from the opposite body side 12. FIG. 9 is a side view of the line holder of FIG. 8, where a screw 31 is shown threaded into the apertures 16 and 32 from body side 12. FIG. 10 is a front view of the line holder, showing the natural bend of the spare lines 18 protruding from the plurality of longitudinal bores 20 after inserting the spare lines 18 into the plurality of longitudinal bores 20 that go through the body 11. In each view, the screw 31 is inserted through respective insertion apertures 28A and 29A on body side 12 through corresponding receiving apertures 28B and 29B on body side 14.

Figure 11:
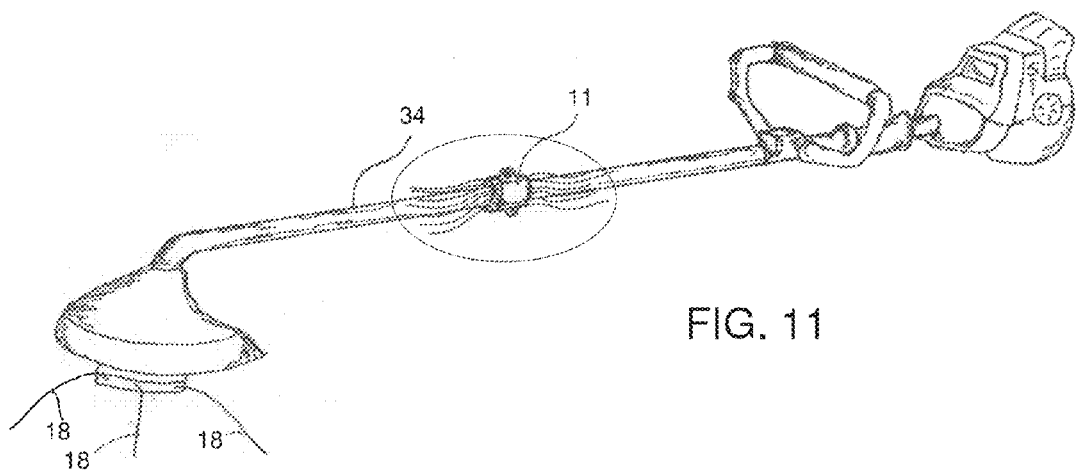
FIG. 11 illustrates a line holder secured around a shaft of garden equipment, such as a weed trimmer, engaged with spare lines inserted into the plurality of longitudinal bores through the body, according to an embodiment of the present invention.
Figure 12A:
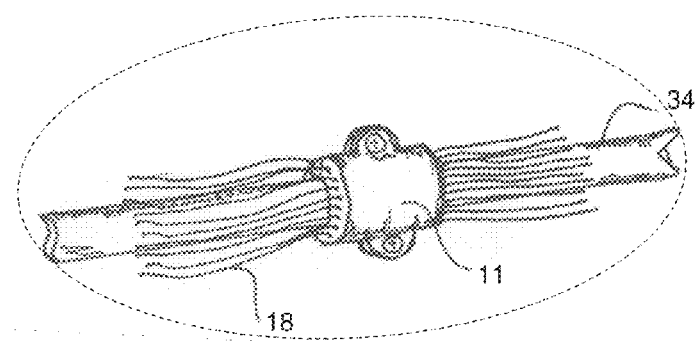
FIGS. 12A and 12B illustrate in greater detail views the line holder secured around the shaft of garden equipment, such as a weed trimmer, engaged with spare lines inserted into the plurality of longitudinal bores through the body, according to embodiments of the present invention.
Figure 12B:
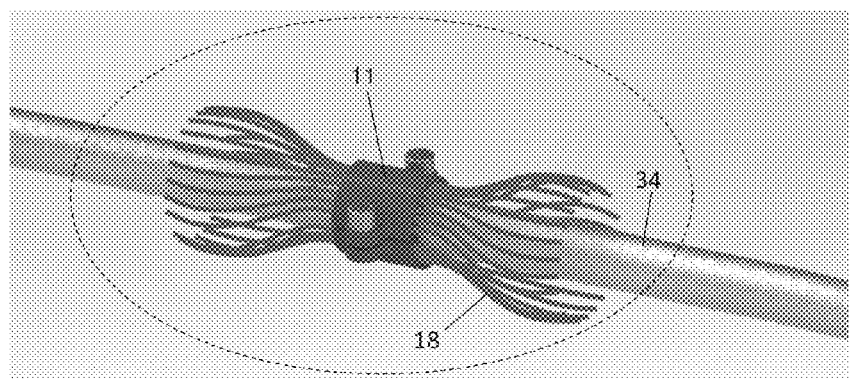

FIGS. 11, 12A and 12B illustrate the line holder affixed onto a weed trimmer shaft 34, with spare lines 18 inserted into the plurality of longitudinal bores 20 through the body 11. According to one or more embodiments, the line holder may be secured around any point of the shaft 34 by placing the two body halves 12 and 14 around the shaft 34 and joining by screws 31 into the apertures 16 and 32. FIGS. 12A and 12B illustrate in different detail views, the line holder secured around the weed trimmer shaft 34 with spare lines 18 inserted into the plurality of longitudinal bores 20 through the body 11. A user may conveniently and quickly pull a spare line 18 from the line holder for installation onto garden equipment when necessary.

According to one or more embodiments, the line holder includes a thin sheet of material (not shown), such as felt, rubber, or other compressible, resilient or grippable material. The thin sheet of material may be placed on an inside surface 24 of the body 11 to establish a more snug or tight fit of the body 11 around garden equipment, such as a weed trimmer shaft 34. A user may establish a tight fit of the body 11 around most weed trimmers without the thin sheet of material (not shown).

Figure 13:
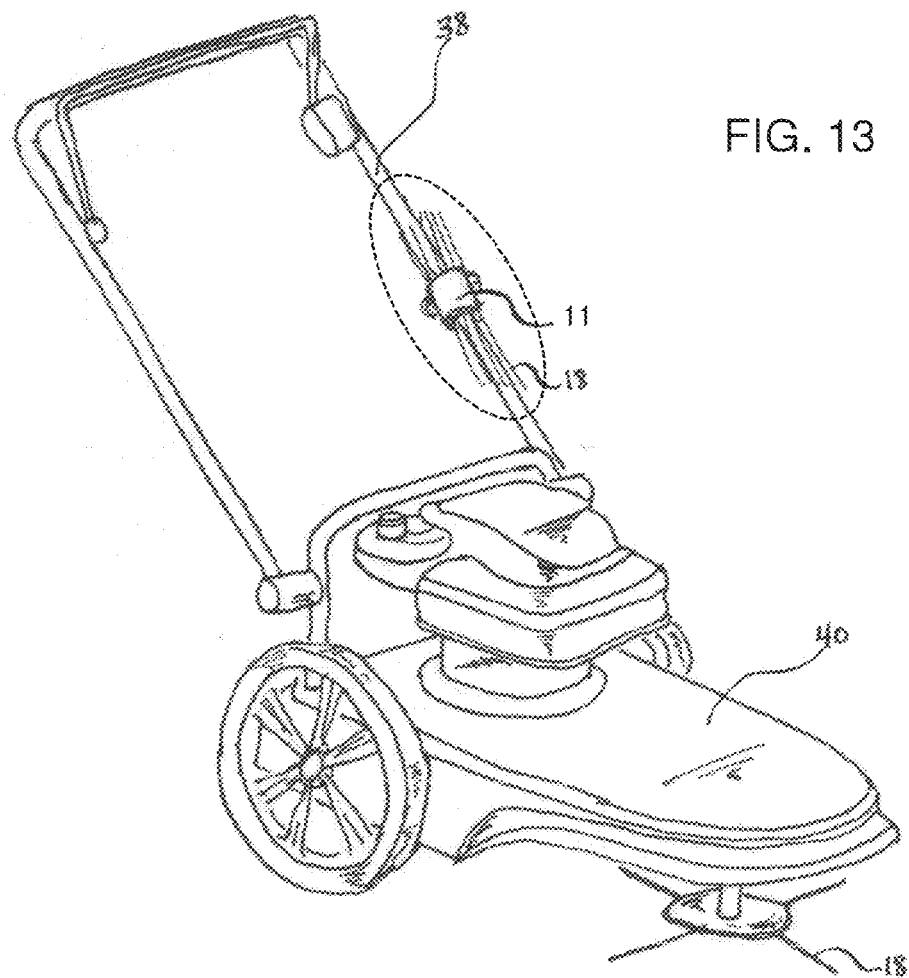
FIG. 13 illustrates a line holder secured around a handle of garden equipment, such as a trimmer mower, engaged with spare lines inserted into the plurality of longitudinal bores through the body, according to an embodiment of the present invention.
Figure 14:
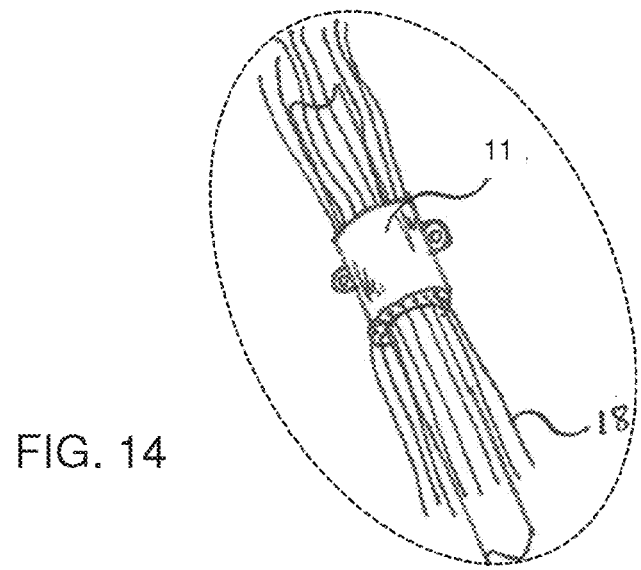
FIG. 14 illustrates in greater detail view the line holder secured around the handle of garden equipment, such as a trimmer mower, engaged with spare lines inserted into the plurality of longitudinal bores through the body, according to an embodiment of the present invention.

Referring now to FIGS. 13-14, the line holder may also be secured at any point around a handle 38 of a trimmer mower 40, with spare lines 18 inserted into the plurality of longitudinal bores 20 through the body 11. FIG. 14 illustrates in detail view of the line holder secured around the handle 38 of the trimmer mower 40 with spare lines 18 inserted into the plurality of longitudinal bores 20 through the body 11. As with FIG. 11, the line holder may be adjusted for positioning along any point of the handle as desired by the user.

The object around which the line holder is secured about can have a cylindrical-like structure such as a shaft of garden equipment so as to match the inner surface of the line holder. In other embodiments, the line holder may be configured with other shaped inner surfaces to accommodate objects of various shaped outer surfaces. In another embodiment, the line holder may be configured to be attached to the operator. For example the body may be formed as a band by incorporating the body sides 12 and 14 onto a comfortable and flexible material for attaching to a body limb of an operator.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments of the foregoing description.

What is claimed is:
1. A line holder comprising:
    a hollow body having an outer surface and an inner surface, a first surface at a first distal end, and a second surface at an opposite second distal end;
    a plurality of longitudinal bores passing through the body from the first surface to the second surface, wherein each of the plurality of bores is configured to receive and hold an individual line; and at least one fastener to secure the body to an object;

wherein the inner surface is configured to contact the object.

2. The line holder according to claim 1, wherein each of the longitudinal bores extends along an individual axis from the first surface to the second surface of the body, the longitudinal bores positioned around the inner surface.

3. The line holder according to claim 1, wherein the hollow body separates into two parts, such that the hollow body clamps around the object in an engaged position.

4. The line holder according to claim 1, wherein the hollow body separates into two equal halves.

5. The line holder according to claim 1, further comprising one or more flanges on the outer surface of the body.

6. The line holder according to claim 5, further comprising an aperture on each of the one or more flanges, configured to receive the fastener.

7. The line holder according to claim 1, wherein the hollow body separates into first and second parts, such that the first and second parts of the hollow body clamp around the object in an engaged position, each of the first and second parts comprising:

one or more flanges on the outer surface, an aperture through each of the one or more flanges, the aperture configured to receive the at least one fastener, thereby locking the first and second parts together and securing the body around the object.

8. The line holder according to claim 7, wherein the one or more flanges on the first part is aligned with the one or more flanges on the second part, the at least one fastener includes one or more screws, and wherein each of the one or more screws is threaded into two apertures of aligned flanges.

9. The line holder according to claim 7, wherein the one or more flanges of the first and second parts comprise a first flange on the first part aligned with a second flange on the second part, the first flange having an insertion aperture, the second flange having a corresponding receiving aperture, and wherein the at least one fastener includes at least one screw threaded through the insertion aperture and receiving aperture.

10. The line holder according to claim 1, wherein the at least one fastener comprises one or more ties.

11. The line holder according to claim 1, wherein the first surface and the second surface are parallel planar surfaces perpendicular to the outer surface of the body.

12. The line holder according to claim 1, wherein the object is a shaft of a cutting device, and the inner surface is configured to surround the shaft.

13. The line holder according to claim 1, wherein the body is substantially cylindrical in shape.

14. The line holder according to claim 1, wherein the body is made of a material selected from the group consisting of a plastic, a resin, a rubber, a metal, a wood, a leather and combinations thereof.

15. The line holder according to claim 1, wherein each of the plurality of longitudinal bores is configured to receive a monofilament line.

16. The line holder according to claim 1, further comprising a sheet of compressible material, located on the inner surface of the body to establish a tight fit of the body around an object.

17. A line holder comprising:

a collar shaped body, the body having
an outer surface and an inner surface,
a first surface at a first distal end, the first surface defined from an outermost edge of the outer surface at the first distal end toward an edge of the inner surface at the first distal end, and
a second surface at an opposite second distal end, the second surface defined from an outermost edge of the outer surface at the second distal end toward an edge of the inner surface at the second distal end,
wherein the body is separable into two segments;

a plurality of longitudinal bores passing through the body from the first surface to the second surface, wherein each of the plurality of bores is configured to receive and hold an individual line;

a pair of flanges on each of the body segments, wherein the pair of flanges on a first body segment is aligned with the pair of flanges on the second body segment so as to form a first aligned set of flanges and a second aligned set of flanges; and a fastener configured to secure the body segments together through at least one of the aligned set of flanges, thereby locking the two body segments together and securing the body around an object.

18. The line holder according to claim 17, further comprising an aperture on each of the flanges, and the fastener is a threaded screw.

19. The line holder according to claim 17, wherein each of the plurality of longitudinal bores extends along a straight axis through the body, and is configured to receive an individual monofilament line.

20. The line holder according to claim 17, wherein the body is substantially cylindrical in shape and the inner surface is configured to fit around an outer surface of the object.

* * * * *